(12) United States Patent
Toutonghi (10) Patent No.: US 8,265,004 B2
(45) Date of Patent: Sep. 11, 2012

(54) TRANSFERRING DATA USING AD HOC NETWORKS

(75) Inventor: Michael J Toutonghi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 727 days.

(21) Appl. No.: 11/558,905

(22) Filed: Nov. 11, 2006

(65) Prior Publication Data

US 2008/0112354 A1 May 15, 2008

(51) Int. Cl.
*H04W 4/00* (2009.01)
*H04M 1/66* (2006.01)
(52) U.S. Cl. .......................... 370/328; 370/338; 455/410
(58) Field of Classification Search .................. 370/328, 370/338; 713/182, 150; 709/229, 227, 206; 726/30, 11, 10; 455/412.1, 41.2, 515
See application file for complete search history.

(56) References Cited

U.S. PATENT DOCUMENTS

| 6,134,662 | A  | * | 10/2000 | Levy et al. ...................... 726/11 |
| 2004/0103312 | A1 | * | 5/2004 | Messerges et al. ........... 713/201 |
| 2004/0203352 | A1 | * | 10/2004 | Hall et al. ..................... 455/41.1 |
| 2004/0259542 | A1 | * | 12/2004 | Viitamaki et al. ......... 455/426.2 |
| 2005/0073979 | A1 | * | 4/2005 | Barber et al. ................. 370/338 |
| 2006/0172701 | A1 | * | 8/2006 | Kienhoefer ................. 455/41.2 |
| 2006/0183462 | A1 | * | 8/2006 | Kolehmainen ............... 455/411 |
| 2007/0015463 | A1 | * | 1/2007 | Abel et al. .................. 455/41.1 |
| 2007/0091345 | A1 | * | 4/2007 | Qiu et al. ..................... 358/1.14 |
| 2007/0105548 | A1 | * | 5/2007 | Mohan et al. ............. 455/426.1 |
| 2008/0062937 | A1 | * | 3/2008 | Mansfield et al. ............ 370/338 |

* cited by examiner

*Primary Examiner* — George Eng
*Assistant Examiner* — Nizar Sivji (57) ABSTRACT

A method for a local device to establish an ad hoc communications channel with a broadcast device is disclosed. The method comprises upon determining that the ad hoc communications link with the broadcast device is required, accessing memory to obtain connection parameters for the broadcast device; and establishing a communications link with the broadcast device by sending a connection request to the broadcast device based on the connection parameters.

17 Claims, 11 Drawing Sheets

TRANSFERRING DATA USING AD HOC NETWORKS

FIELD

Embodiments of this invention relate to translating data using an ad hoc network.

BACKGROUND

As used herein the term "ad hoc" network refers to a network in which a topology of the network is dynamic in the sense that the nodes of the network are spontaneously created and change over time. An example of an ad hoc network is a Blue Tooth Network, wherein nodes are able to connect to each other in accordance with the Blue Tooth wireless standard.

In accordance with the Blue Tooth wireless standard, a node wishing to establish a communications link with another node, actively pages the other node for a compatible Bluetooth service and then connects to the Bluetooth service using connection parameters supplied by the other node. Actively paging for the other node, in the manner as described above, uses more power than other modes for a Bluetooth radio, as defined in the Bluetooth wireless standard. This is undesirable, particularly in the case where the Bluetooth radio is integrated as part of a device that has a limited power supply.

SUMMARY

In one embodiment, there is provided a method for a local device to establish an ad hoc communications link with a broadcast device. The method comprises, upon determining that the ad hoc communications link with the broadcast device is required accessing memory to obtain connection parameters for the broadcast device, and establishing a communications link with the broadcast device by sending a connection request to the broadcast device based on the connection parameters.

In another embodiment, there is provided a method for establishing a secure communications channel between a first device and a second device using an ad hoc communications protocol. The method comprises assigning a globally unique identifier (GUID) to each of the first and second devices; communicating the GUID for the first device to the second device and the GUID for the second device to the first device, using a trusted system; on each of the devices saving a symmetric encryption key received from the trusted system, on the first device, polling for the second device based on the GUID of the second device, receiving a response to the polling of the second device, authenticating the response in software; and establishing a secure communications link with the second device by encrypting packets sent to the second device using the symmetric encryption key.

In another embodiment there is provided a method for a first device to transfer data to a second device. The method comprises, in a first mode, checking memory for connection parameters to establish a communications link with the second device using an ad hoc networking protocol; if the connection parameters are found in memory then establishing the communications link with the second device, and transferring the data to the second device over the communications link; and in a second mode transferring the data to the second device over a cellular network.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
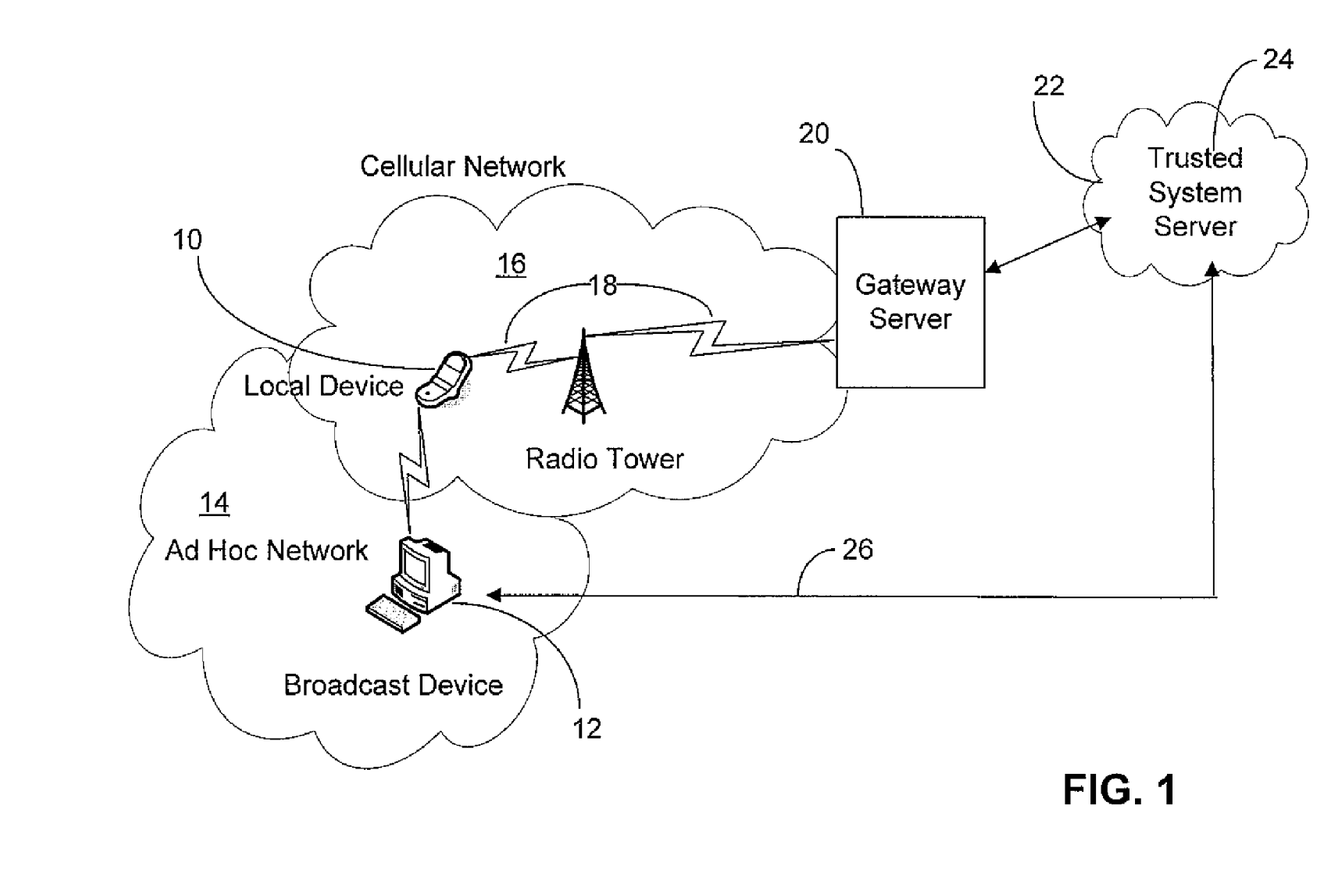
FIG. 1 shows the communications channels that may be setup between a locate device, a broadcast device, and a trusted system server in accordance with one embodiment of the invention.

Embodiments of the present invention will be described with reference to FIG. 1 of the drawings. Referring to FIG. 1 reference numeral 10 generally indicates a local device which is generically intended to represent any type of handheld device which supports an ad hoc networking protocol and is able to communicate via a cellular network. For example, a cellular telephone may be representative of a local device 10. In accordance with one embodiment of the invention. As depicted in FIG. 1, the local device 10 communicates with a broadcast device 12 by means of an ad hoc communications channel 14 established with the broadcast device 12. The broadcast device 12 may represent any type of computing device that supports communications with the local device 10 via the ad hoc communications channel 14, and which is not subject to the restriction of having limited battery life. As such, a notebook computer, or a desktop personal computer (PC) may be representative examples of a broadcast device 12. As can be seen from FIG. 1 of the drawings, the local device 10 is part of a cellular network 16, and is able to communicate by means of a communications link 18 within the cellular network 16 with a gateway server 20 that bridges communications between the cellular network 16 and a wide area network 22, which in one embodiment may be the Internet. The gateway server 20 relays communications from the local device 10 to a trusted system server 24 which is part of the network 22. Communications between the broadcast device 12 and the trusted system server 24 occur through a communications channel 26. Thus, the local device 10 is able to communicate with the broadcast device 12 via an ad hoc networking link 14 for example a Bluetooth link, as well as with the trusted server system 24, via an over the air cellular link 18.

In order to enhance understanding of the techniques of the present invention, the use of the local device 10 in a particular case will be described. In this case, the local device 10 has data to be transferred to the broadcast device 12. As an example, consider the case where the local device 10 is a camera-equipped mobile telephone, and the data to be transferred to the broadcast device 12 represents a newly captured image. In one mode of operation, particularly when the local device 10 is located within its local cellular network 16 as opposed to a roaming cellular networks image data relating to the newly captured image may be transferred to the broadcast device 12 using the communication links 18, and 26. However, it will be appreciated, that this mode of operation may not be suitable in the case where the local device 10 is roaming, and is therefore not within its own cellular network 16. In this case, heavy roaming charges may be incurred in transferring the image data from the local device 10 to the broadcast device 12 using the communications links 18 and 26. Thus, when the local device 10 is not within its local cellular network 16 and is thus roaming, it may be preferable to transmit the image data to the broadcast device 12 over the ad hoc communications link 14. However, using prior art techniques, there may be considerable overhead in terms of increased battery consumption that may be incurred in establishing and maintaining the ad hoc communications link 14 with the broadcast device 12.

Figure 2:
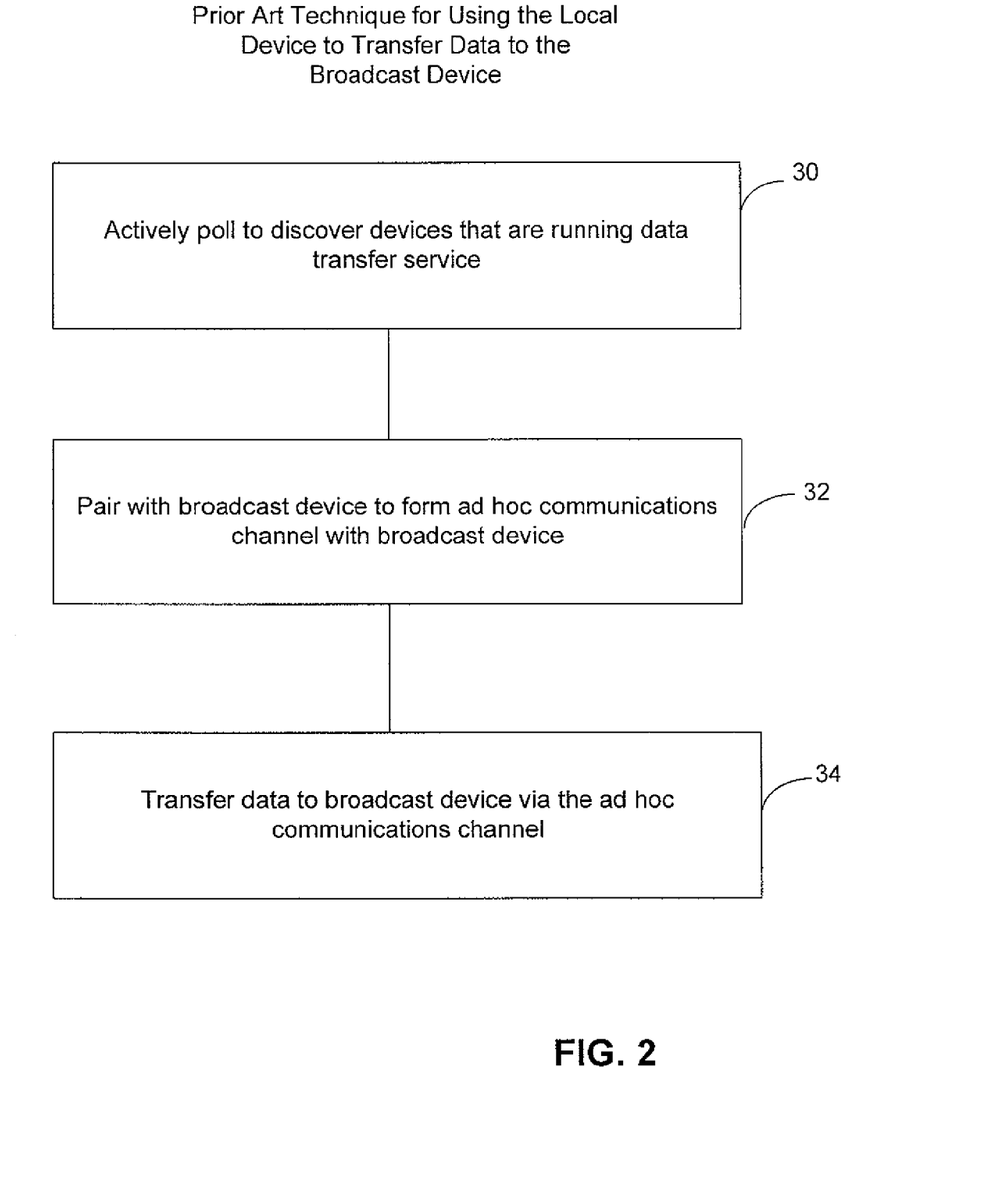
FIG. 2 illustrates a prior art technique for using a local device to transfer data to a broadcast device.

To fully illustrate the nature of this overhead, reference is made to FIG. 2 of the drawings, wherein a prior art technique for using the local device 10 to transfer data to the broadcast device 12. As will seen from FIG. 2, at block 30 the local device 10 actively polls to discover devices, within its immediate vicinity, that are running an appropriate data transfer service to facilitate transfer of the image data between the local device 10 and a device that runs the data transfer service (i.e. a device such as broadcast device 12). Assuming that as a result of the polling at block 30, the broadcast device 12 is discovered, then the local device 10 will initiate a transaction with the broadcast device 12 in order to pair with the broadcast device 12 thereby to form an ad hoc communication channel 14 with the broadcast device 12. At block 34, once the local device is paired with the broadcast device 12, the data is transferred to the broadcast device via the ad hoc communications channel. It will be appreciated, that since the local device is a portable and mobile device it is limited in terms of its power supply when compared to the broadcast device 12 which generally is powered by an AC power supply.

In the operations described with reference to FIG. 2 it is the local device 12 with a limited power supply that is doing the active polling. Thus, a radio or base band unit of the local device 12 will need to be turned on, resulting in increased consumption of a battery of the local device 10.

Embodiments of the present invention allow the local device 10 to be "paired" with the broadcast device 12 to form the ad hoc communications channel 14, without the overhead of the local device 10 having to actively poll to discover the presence of the broadcast device 12

Figure 3:
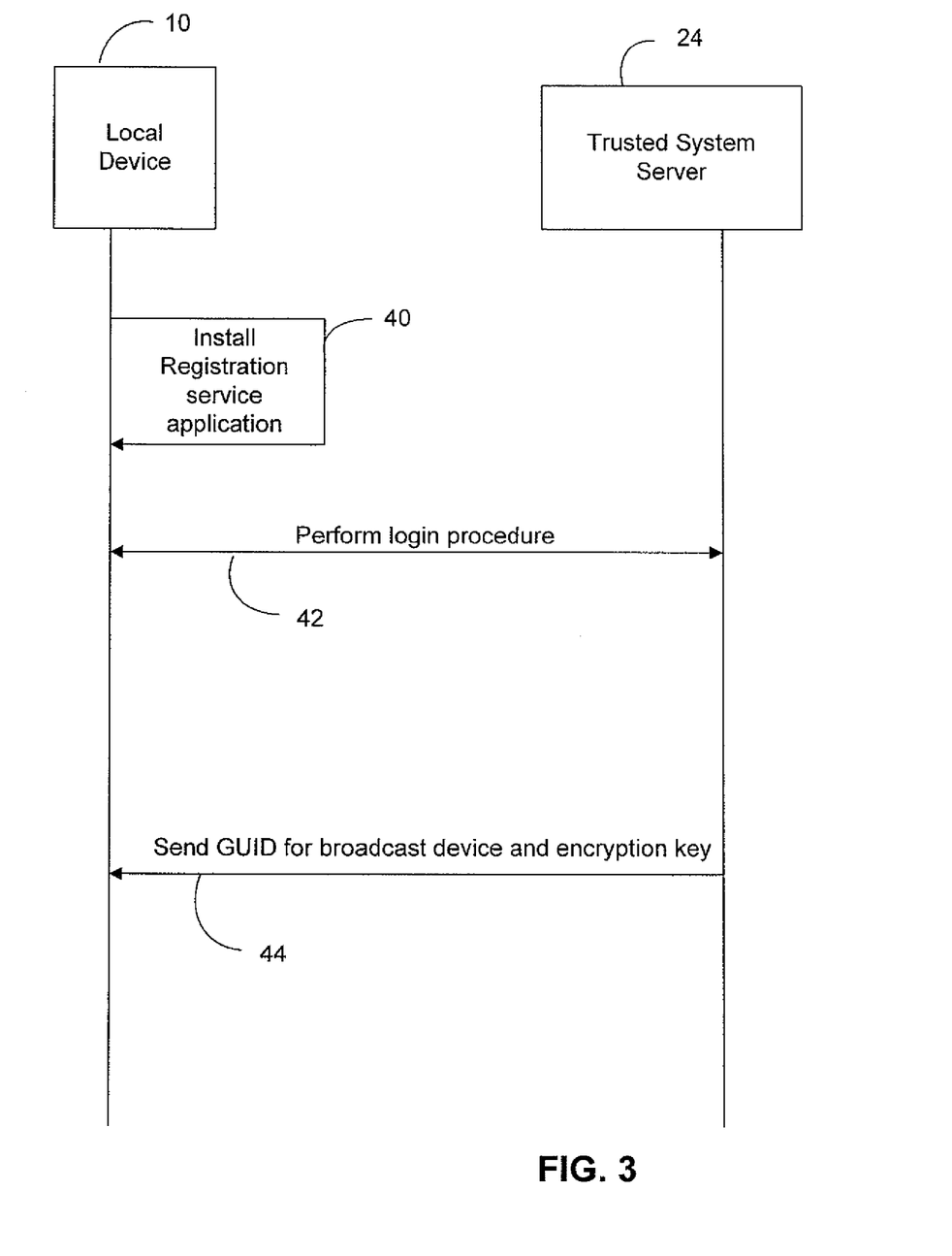
FIG. 3 illustrates a registration procedure between a local device and a trusted system server, in accordance with one embodiment of the invention.

In one embodiment, a technique to establish the ad hoc communications channel 14 begins with a registration procedure performed between the local device 10 and the trusted server system 24. The particular operations performed during this registration procedure, in accordance with one embodiment of the invention, is shown in FIG. 3 of the drawings. Referring to FIG. 3 at block 40, the local device 10 installs a registration service application 40. In one embodiment, the registration service application may be downloaded from the trusted server system 24, for example using the cellular communications link 18. At block 42, once the registration service application has been stored, a login procedure is performed. In one embodiment this login procedure may involve a user of the local device 10 supplying authentication information such as username and password to the trusted server system 24. As part of the login procedure, the trusted service system 24 will authenticate the username and password and at block 44 send a globally unique identifier (GUID) for the broadcast device 12 with which the local device 10 has permissions to communicate. The trusted server system 24 also provides an encryption key to the local device 10, at block 44. The encryption key is to be used by the local device 10 to encrypt all communications with the broadcast device 12.

One example of the trusted system server 24 may facilitate understanding of the role of the trusted system server 24 in accordance with the techniques described herein. In this example the trusted system server 24 forms part of a trusted system operated by a business entity to provide a service in terms of which a user may subscribe to obtain an online "place" to serve as a repository of digital data in the form of music, photographs, videos, documents, etc.

As part of the service provided by the trusted system, a user may login to the trusted system server 24 using various devices, for example, notebook computers, desktop PCs, one or more handheld devices, for example PDAs, cellular telephones, etc., and the trusted system server generates globally unique identifiers for each of the devices of the user. Additionally, the trusted server system 24 also generates a symmetric encryption key to be shared between all devices associated by the user. Further, the trusted system server 24 provides procedures in terms of which data between the user's various devices may be synchronized, and accessed. The net result of the registration operation performed between the local device 10 and the trusted system server 24, as described with reference to FIG. 3 of the drawings, is that the local device 10 has GUID the for the broadcast device 12, as well as an encryption key to encrypt/decrypt communications with the broadcast device 12.

The broadcast device 12 enters into a registration operation with the trusted system server 24 which is very similar to the registration operation described with reference to FIG. 3. The registration operation between the broadcast device 12 and the trusted system server 24, in accordance with one embodiment of the invention, is illustrated in FIG. 4 of the drawings.

Figure 4:
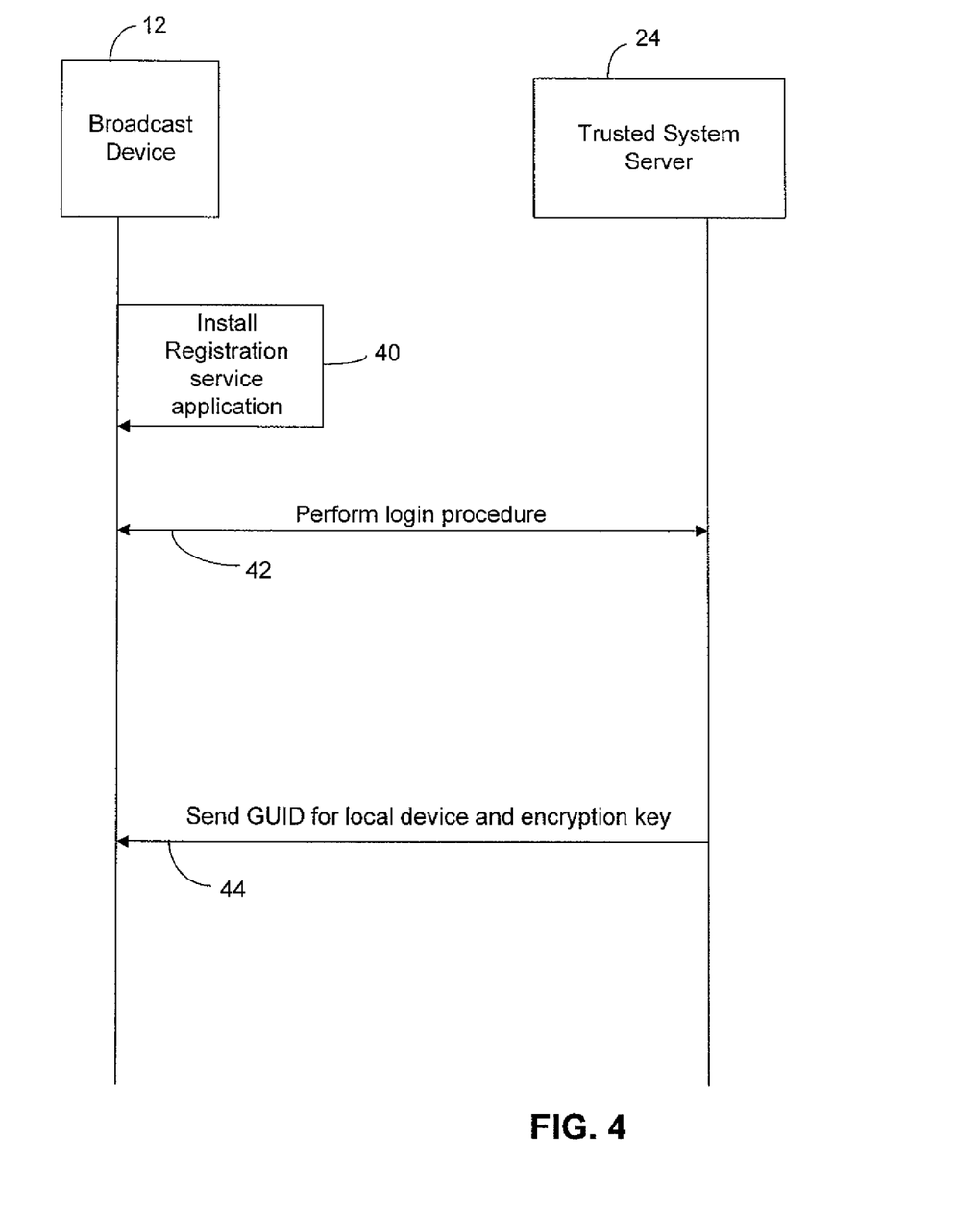
FIG. 4 illustrates a registration procedure between a broadcast device and a trusted system server, in accordance with one embodiment of the invention.

As the registration operation between the broadcast device 12 and the trusted system server 24 is similar to the registration operation between the local device 10 and the trusted system server 24, the same reference numerals used with reference to FIG. 3 have been used in FIG. 4 to depict like operations. At the end of operations performed with reference to FIG. 4, the broadcast device 12 knows the GUID for the local device 10, and has the symmetric encryption key which is shared with the local device 10. Once the broadcast device 12 has completed the registration procedure with the trusted system server 24, the broadcast device 12 is ready to perform the first of a two stage procedure in terms of which the ad hoc communication channel 14 between the local device 10 and the broadcast device 12 may be setup, without the local device 10 having to actively poll for the presence of the broadcast device 12. The first of the two stage procedure, is depicted in FIG. 5 of the drawings, in accordance with one embodiment.

Figure 5:
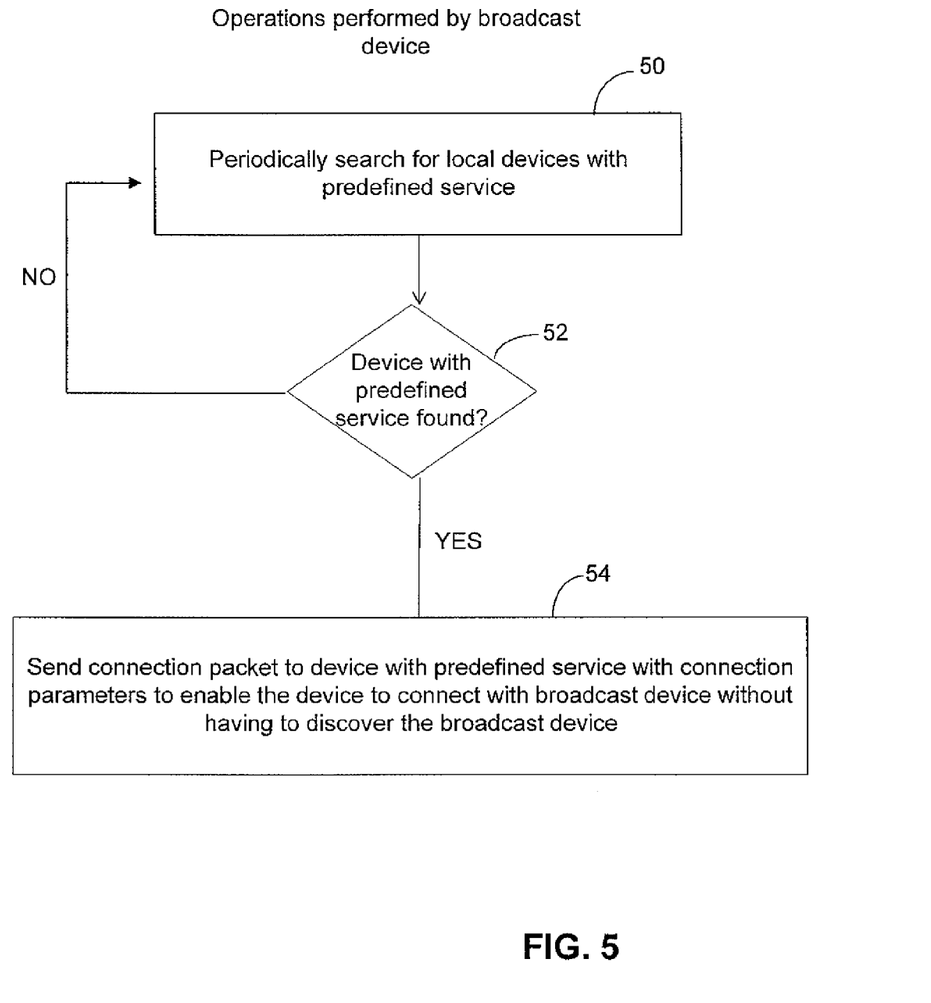
FIG. 5 illustrates the operations performed by a data transfer service registration operation running on a broadcast device, in accordance with one embodiment of the invention.

Turning to FIG. 5, at block 50, the broadcast device 12 periodically searches for local devices 10 which may be running a predefined service (i.e. a data transfer application registration service). The operations performed at block 50 require the broadcast device 12 to turn on its transmitter and to send a page scan in accordance with the ad hoc networking protocol, which may be the Bluetooth protocol, to local devices 10 within the area. The page scan may include the GUID of the local device 10 that broadcast device 12 is registered to search for or seek. At block 52, if the local device 10 is found then control passes to block 54, otherwise control passes to block 50. At block 54, the broadcast device 12 sends a connection packet to the device that is running the predefined service i.e. the local device 10. The connection parameters are to enable the local device 10 to connect with the broadcast device without having to discover the broadcast device using the prior art technique described with reference to FIG. 2 of the drawings. Exactly how the broadcast device 12 determines that the local device 10 running the predefined service has been found will become clear from the description of FIG. 6 below.

Figure 6:
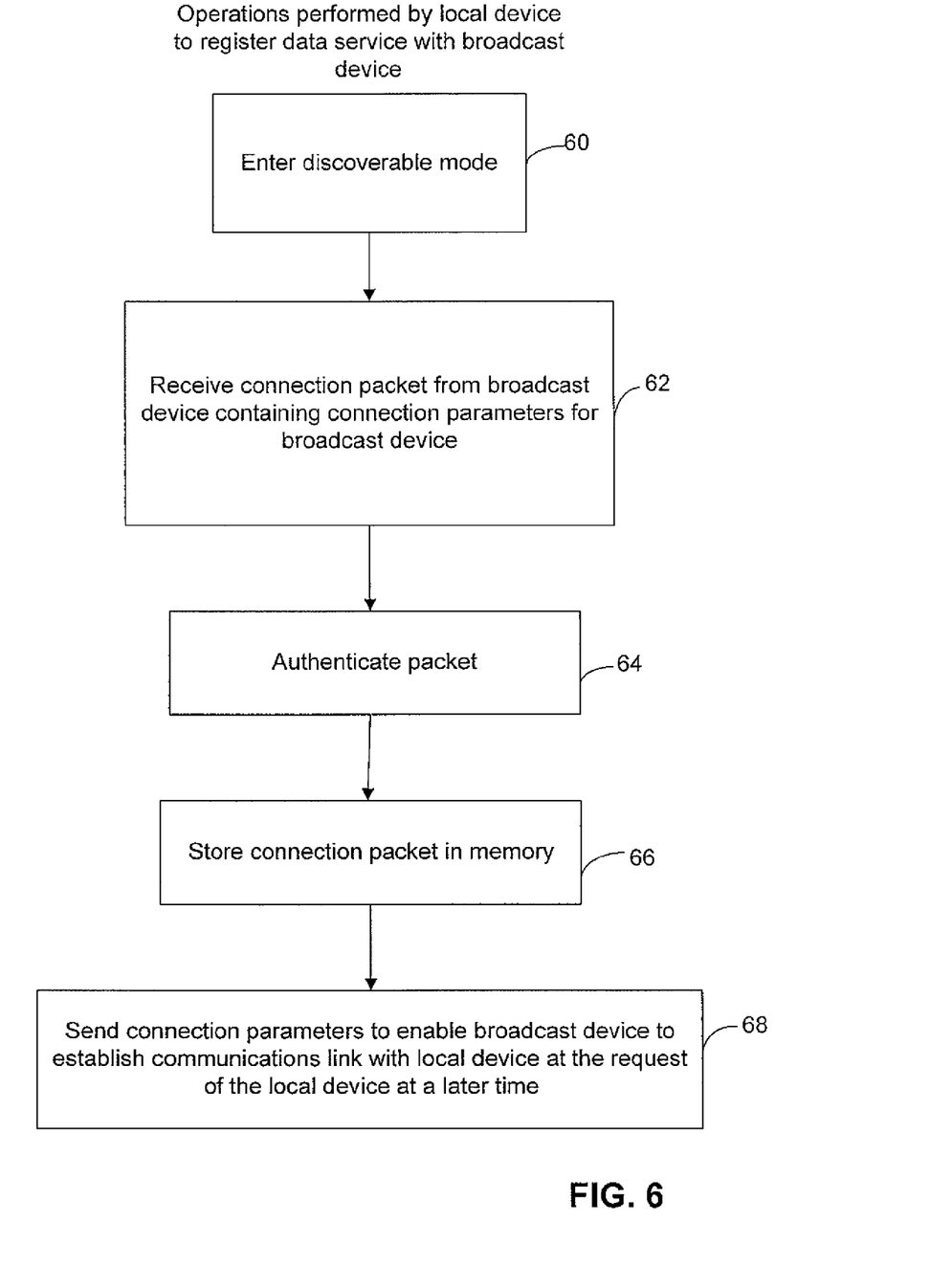
FIG. 6 illustrates the operations performed by the data transfer service registration application running on a local device, in accordance with one embodiment of the invention.

In FIG. 6, the operations performed by the local device 12 to register the data service with the broadcast device 14, in accordance with one embodiment of the invention, are shown. As will be seen, at block 60 the local device 12 enters a discoverable mode This is a low power mode, in which the base band of the local device 12 is selectively turned on at certain intervals in order that the local device 12 may be paged or discovered by another device (i.e. the broadcast device 12). In one embodiment, the discoverable modes may be the limited or general discoverable mode as defined in the Bluetooth wireless standard.

At block 62, the local device 10 receives a connection packet from the broadcast device 12. The connection packet includes connection parameters that will enable the local device 10 to connect or establish an ad hoc communications channel with the broadcast device 12. In accordance with ad hoc communications protocol. For example, in the case of the ad hoc communications protocol being in accordance with a Bluetooth wireless standard, the connection parameters may include a device address, system clock, and page scan mode for the broadcast device 12. The local device 12 receives a connection packet from the broadcast device 14. At block 64, the local device 10 authenticates the connection packet in accordance with various authentication schemes, in accordance with the different embodiments of the invention. However, in one embodiment, the connection packet is authenticated using the symmetric key which is shared with the broadcast device 12. At block 66, the connection packet is stored in a memory of the local device 10. At block 68, the local device 10 sends connection parameters to the broadcast device 14. The connection parameters are to enable the broadcast device 12 to establish an ad hoc communications link with the local device, at the request of the local device 10, and at a later time. The connection parameters are in accordance with the ad hoc communications protocol being used, and in the case of the ad hoc communications protocol being in accordance with the Bluetooth wireless standard, will include a device address, system clock, and page scan mode for the local device 10. It is important to appreciate that at the end of the operations described with reference to FIG. 6, the local device 10 has stored in its memory connection parameters to enable it to establish an ad hoc communications link with the broadcast device 12, at later time, determined when data needs to be transferred from the local device 10 to the broadcast device 12.

Figure 7:
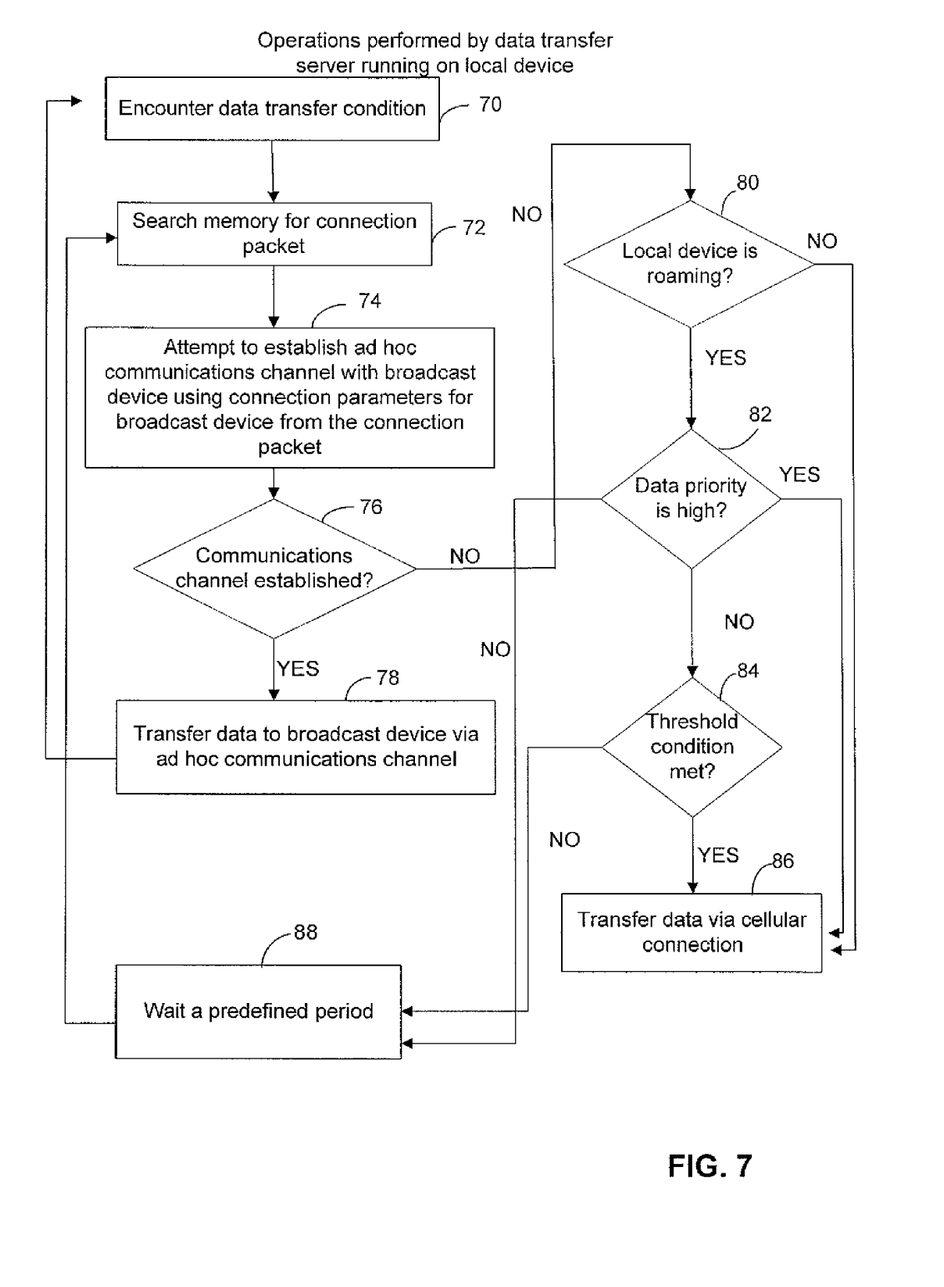
FIG. 7 shows the operations performed by a data transfer application running on a local device, in accordance with one embodiment of the invention.

The local device 10 and the broadcast device 12, are known to each other as a result of operations performed by data transfer application registration service running on each of the devices 10 and 12. In order to actually transfer data, the local device 10 runs a transfer application/service to perform the second step in the previously mentioned two stage procedure. Operations performed by the data transfer application, in accordance with one embodiment of the invention shown, are in FIG. 7 of the drawings. Referring to FIG. 7, at block 70, the local device 10 encounters a data transfer condition. Different embodiments may have different data transfer conditions. However, in the case of one embodiment, the data transfer condition may include the storage of new image data associated with a newly captured image, at a particular memory location. The storage of the image data at the particular location acts as a trigger for the data transfer service to transfer the image data to the broadcast device 12, as will be described. At block 72, the memory (cache) of the local device 10 is searched for a connection packet that would enable the local device 10 to connect or establish an ad hoc communications link/channel with the broadcast device 12. At block 74, if such a connection packet is found, then an attempt is made to establish the ad hoc communications channel with the broadcast device 12 using the connection packet. In one embodiment the connection packet may include information to indicate whether the broadcast device 12 is to be a master device or a slave device. For this embodiment If the broadcast device 12 is to be a master device then instead of attempting to establish the ad hoc communications channel with the broadcast device 12 as described, the local device 12 queues the data transfer condition until the broadcast device 12 polls the local device 10 again (see block 50 of FIG. 5), when the broadcast device 12 next polls the local device 10, the local device 10, responds by sending a "connect now request" to the broadcast device 12, over the communications channel used by the broadcast device 12 to poll the local device 10. Essentially, the "connect now request" is a cue for the broadcast device 12 to establish an ad hoc communications channel with the local device 10 so that the broadcast device 12 is a master device and the local device 10 is a slave device. The above described mode of establishing the ad hoc communications channel using the "connect now request" allows the broadcast device 12 to establish simultaneous ad hoc communications channels with multiple local devices so that a scatternet may be formed. If no packet is found in memory then control process from block 72 to block 80. At block 76 if the communications channel between the local device 10 and the broadcast device 12 is successfully established then control passes to block 78, otherwise control passes to block 80. At block 78, the data is transferred from the local device 10 to the broadcast device 12 via the ad hoc communications channel established between the local device 10 and the broadcast device 12. At block 80, it is determined that the local device 10 is roaming (i.e. not within its own cellular network 16), then control passes to block 86, where the data is transferred to the broadcast device 14 via a cellular connection, using links 18 and 22 (see FIG. 1 of the drawings). It will be appreciated that since the local device 10 is not roaming, then there may be no additional roaming charges incurred by transferring the data using the cellular connection at block 86. However, if at block 80, it is determined that the local device 10 is in fact roaming then control passes to block 82 where it is determined whether a priority associated with the data is high. For example, in accordance with various embodiments of the invention, a user may assign certain priorities to the data to be transferred. If an assigned priority is high, then the user may wish to incur the additional roaming charges associated with the transmission of the data to the broadcast device 14, over the cellular network, in which case control passes to block 86. However, if the data is of a low priority nature then control passes to block 84 where it is determined if various user defined threshold conditions are satisfied or met. For example, in one embodiment, a threshold condition may include the amount of data/images reaching a certain threshold before the user is prepared to incur roaming charges associated with the transmission of the data to the broadcast device 14 over a cellular network. In one embodiment, the user may specify that only when the number of images reaches say 20 or 30 should those images be transferred over a cellular link with the broadcast device 14 while roaming. If the data priority is high, or the threshold conditions are not met, then control passes to block 88 where the local device 10 waits for a predefined period of time control passes to block 72 where the memory is again searched for a connection packet with which to establish a communications channel with the broadcast device 14 using the ad hoc communications protocol. It will be appreciated, that as a result of the operations performed by the data transfer service described with reference to FIG. 7, the local device 10 has an ability to establish a channel with the broadcast device 12, as and when needed, without having to incur the overhead of polling or discovering the presence of the broadcast device 12. Moreover, the operations performed by the data transfer service ensure that user has the ability to seamlessly transfer data from the local device 10 to the broadcast device 12 over an ad hoc communications link, or a cellular communications link, the choice of the particular link used being determined by user defined criteria including whether or not it is permissible to incur roaming charges over the cellular link in order to transfer the data.

Figure 8:
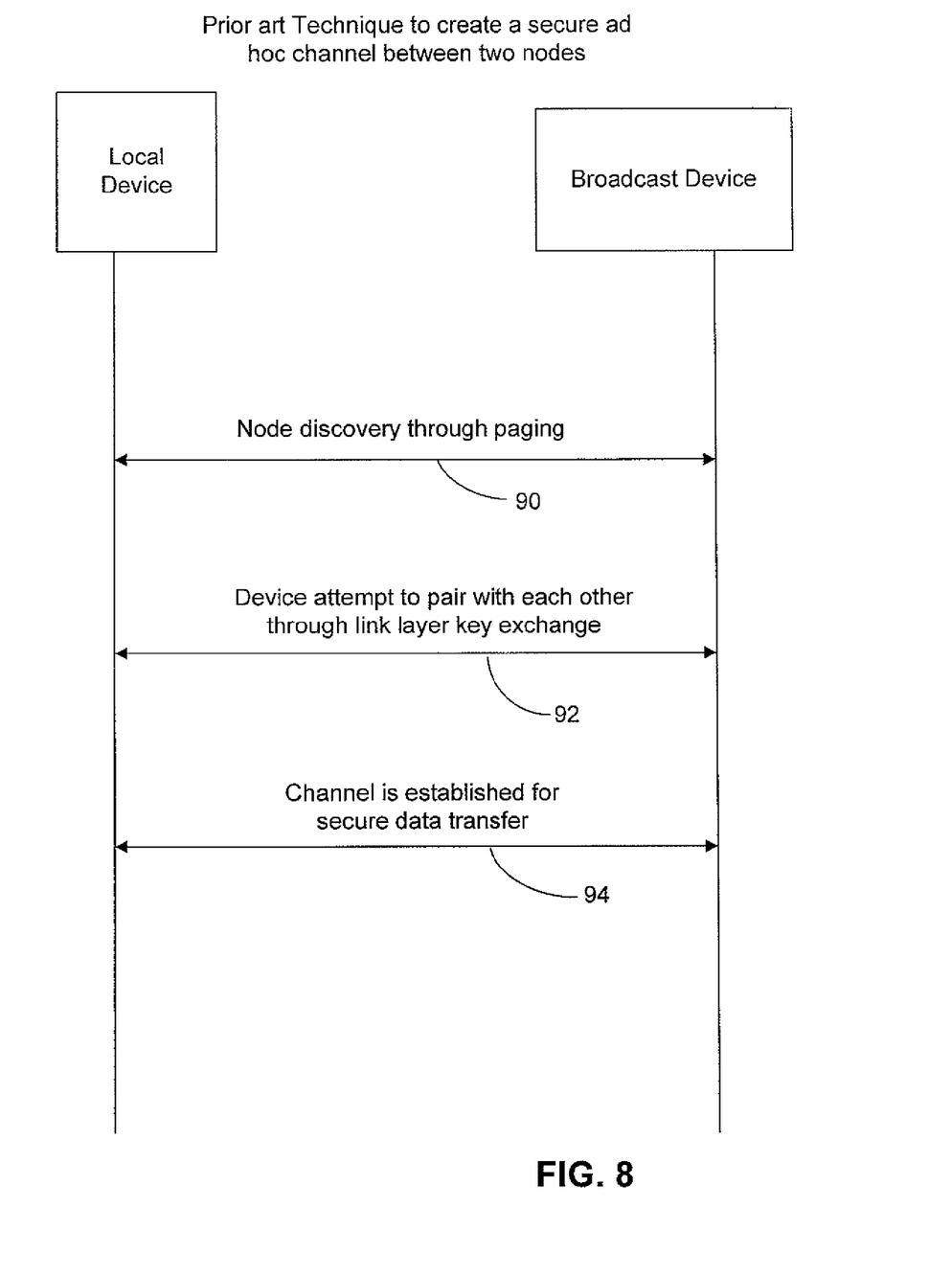
FIG. 8 illustrates a prior art technique to create a secure ad hoc channel between two nodes.

Referring now to FIG. 8 of the drawings, there is shown a prior art technique to create a secure ad hoc channel between two nodes, here the local device 10, and the broadcast device 12. As will be seen, at block 90 at least one of the nodes discovers the other through paging as defined by the ad hoc networking protocol established via the ad hoc channel. At 92 the local device 10, and the broadcast device 12 attempt to pair with each other through the exchange of symmetric keys at a link layer. At 94 the secure ad hoc channel is established for purposes of secure data transfer. Inherent in the technique of FIG. 8 is the requirement that the nodes that are paired together to establish the secure ad hoc channel are to authenticate each other through a link layer authentication procedure.

Figure 9:
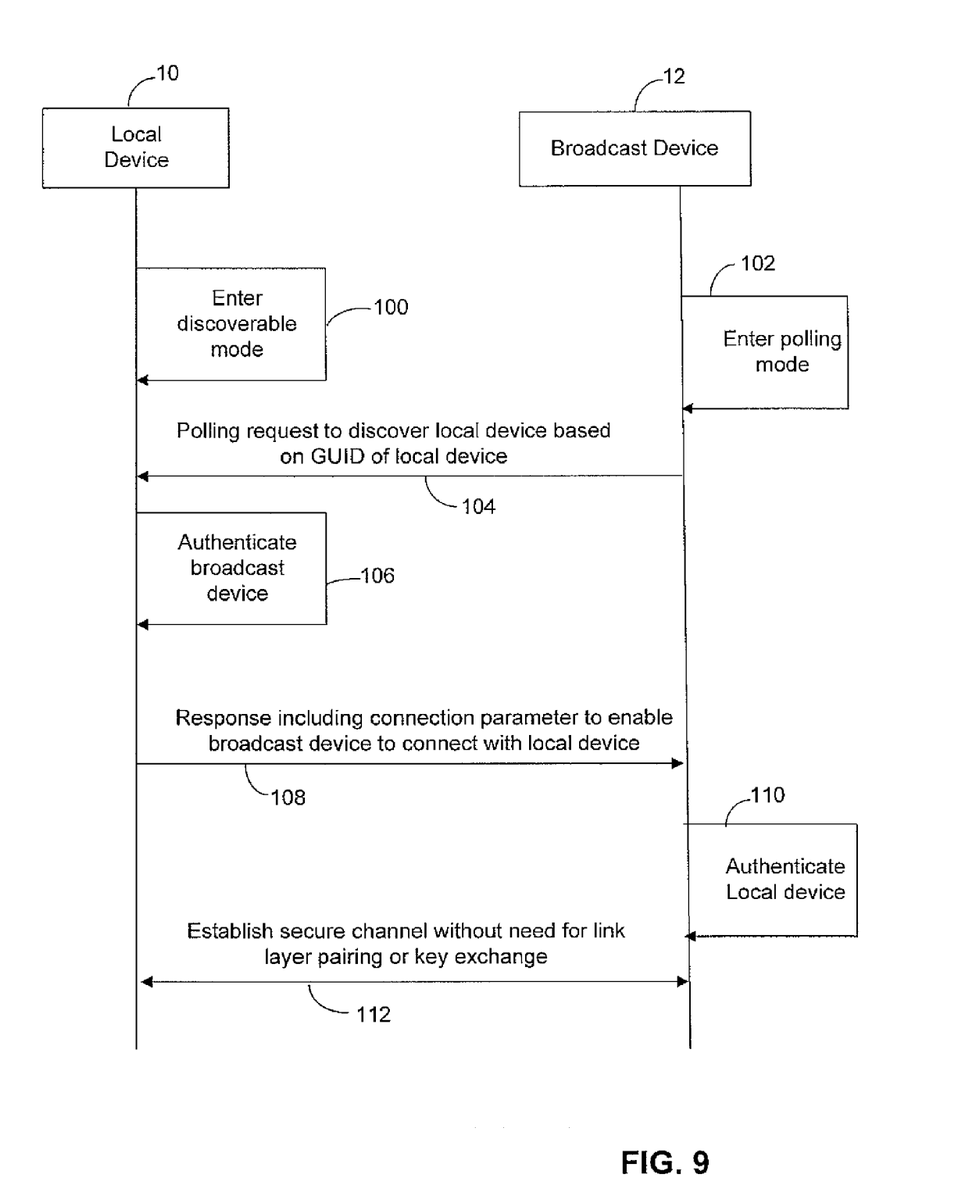
FIG. 9 illustrates a technique to create a secure ad hoc channel between two nodes, without link layer pairing (key exchange), in accordance with one embodiment of the invention.

In one embodiment, the invention provides a technique to create a secure ad hoc channel between two arbitrary nodes, at an application level, and without link layer pairing or key exchange this technique is illustrated in FIG. 9 of the drawings. Referring to FIG. 9 at 100 the local device 10 enters a discoverable mode. As noted above, this is generally a low power mode, wherein a base band unit associated with the local device 10 is selectively turned on at certain time intervals to enable the local device 10 to be discovered by the broadcast device 12. In accordance with the techniques described above. At 102, the broadcast device 12 enters a polling mode in order to discover the local device 10. At 104 therefore, the broadcast device 12 sends a polling request to discover the local device 10. The polling request includes the GUID of the local device 10, which is known to the broadcast device 12 as a result of the registration operation performed with the trusted system server 24. At 106, the local device then authenticates the broadcast device 12. In one embodiment, the authentication scheme used to authenticate the broadcast device 12 uses the symmetric key shared between the local device 10 and the broadcast device 12 as a result of each of devices 10 and 12 having performed the registration procedure with the trusted system server 24, as described above. At 108, the local device 10 then sends a response to the broadcast device 12. The response is to the polling request, and includes connection parameters to enable the broadcast device 12 to connect with the local device 10 pursuant to a connection request from the local device 10. At 110, the broadcast device 12 authenticates the connection parameters received from the local device 10. As noted above, the connection parameters are authenticated using the symmetric key shared between the local device 10 and broadcast device 12. At 112, a secure communications channel is established between the local device 10 and the broadcast device 12 based on the shared symmetric key, without the requirement for link layer pairing of key exchange.

Figure 10:
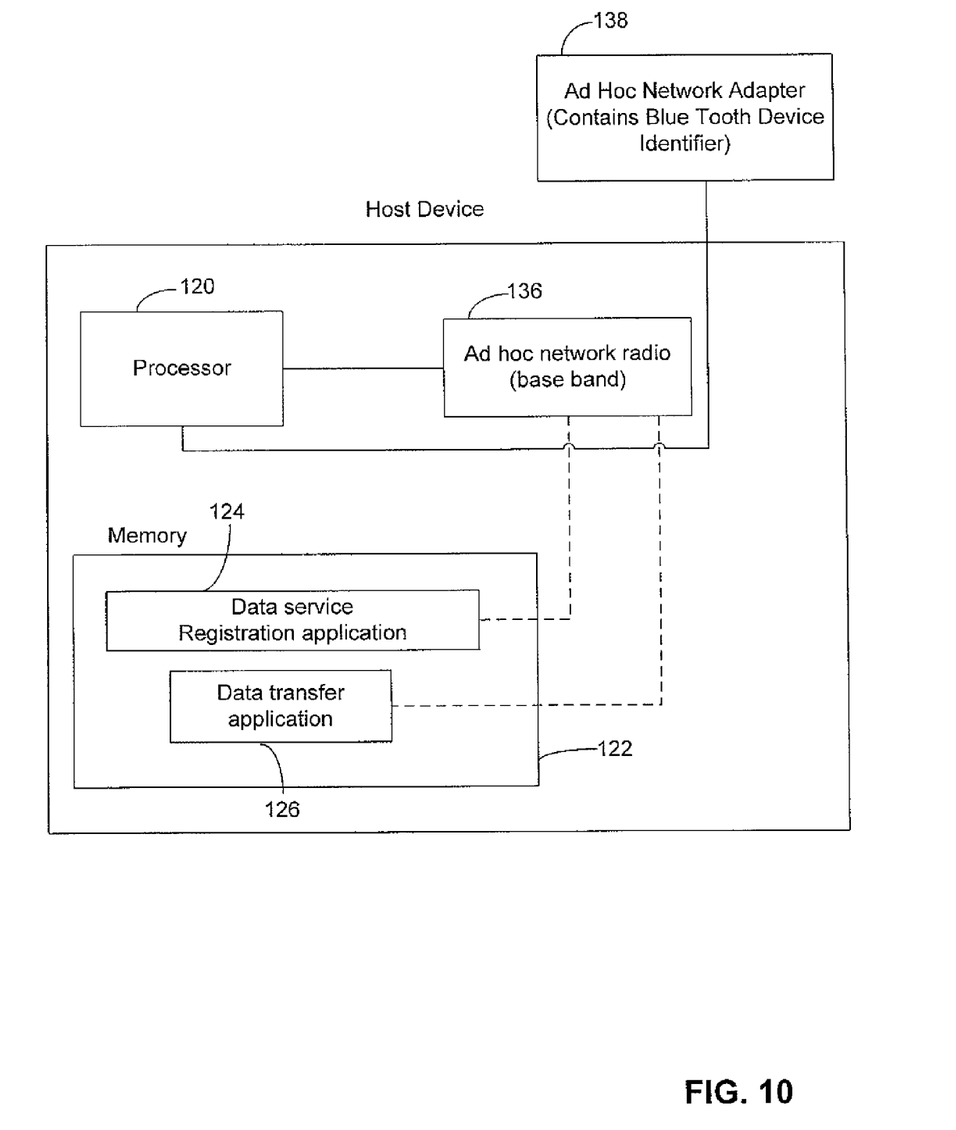
FIG. 10 shows a high level block diagram of hardware that may be used to implement a local device, or a broadcast device, in accordance with one embodiment of the invention.

Referring now to FIG. 10 of the drawings, there is shown high level block diagram of hardware that may be used to implement either local device 10, or the broadcast device 12. As will be seen, the hardware includes a processor 120 which is coupled a memory 122 by means of a bus. The memory 122 includes a data service registration application 124 and a data transfer application 126. The data service registration application 124 enables the devices 10, and 12 to perform the data service registration operations described above, whereas the data transfer application 126 causes the local device 10 to transfer data to the broadcast device 12, in accordance with the techniques described above.

Figure 11:
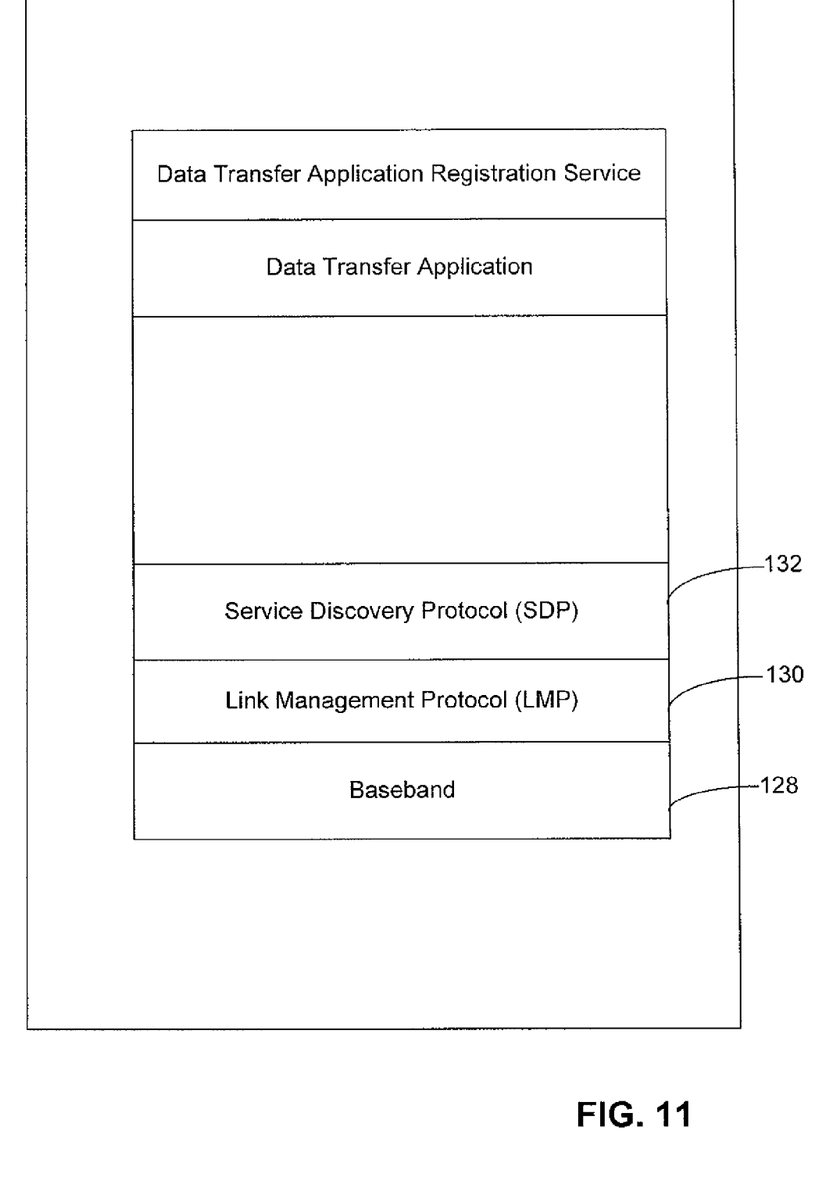
FIG. 11 shows an example of a protocol stack for an ad hoc networking protocol supported by a broadcast device, and a local device, in accordance with one embodiment of the invention.

FIG. 11 of the drawings illustrates how the applications 124, and 126 relate to a network protocol stack used by the devices 10 and 12. Referring to FIG. 11, it will be seen that each of the devices 10 and 12 implement an ad hoc networking protocol stack which includes a base band layer 128, a link management protocol (LMP) layer 130, and a service discovery protocol (STP) layer 132. At the top of the stack is an application layer of which the data transfer application registration service 124, and the data transfer application 126 form a part. Referring back to the FIG. 10 of the drawings, the devices 10, 2 each include an ad hoc network radio (base band 136) which is coupled to the processor 122 via a host controller interface. The base band 136 includes a unique device identifier which is used to identify devices 10, and 12, as nodes within the ad hoc network. In some cases, the devices 10 and 12 may not include the radio 136, in which case an external ad hoc network adapter 138 may be coupled with the process 120 via, for example, a universal serial bus (USB) cable. In such a case, the identifier used to identify devices 10, and 12 within an ad hoc network will be the identifier of the adapter device 138. It will be appreciated that, when the adapter device is removed and coupled with another device, there may be security concerns. In accordance with the above described techniques, identification of nodes within an ad hoc network is based on the GUIDs supplied by the trusted system server 124. Thus, security risks associated with authentication techniques that rely on the device identifier for the plugin adapter 138, are not present.

In general, the routines executed to implement the embodiments of the invention, maybe implemented as part of an operating system or a specific application, component, program, object, module or sequence of instructions referred to as "computer performs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution Examples of signal bearing media include recordable type media such as volatile and non-volatile memory devices, floppy and other removable disks, hard disk drives, optical disks (erg. CD ROMS, DVDs, etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for a local device to establish an ad hoc wireless communications link with a broadcast device, the local device having been assigned a first identifier and the broadcast device having been assigned a second identifier, the method comprising:
   receiving from a trusted system, at the local device, the second identifier for the broadcast device;
   upon determining that the ad hoc wireless communications link with the broadcast device is to be formed, monitoring for a communication from the broadcast device identifying the local device by the first identifier for the local device, while the local device is in a low power discoverable mode in which a radio of the local device is turned on selectively;
   receiving connection parameters for the broadcast device from the broadcast device during a service registration operation with the broadcast device; and
   establishing the ad hoc wireless communications link with the broadcast device by sending a connection request to the broadcast device based on the connection parameters.

2. The method of claim 1, wherein the ad hoc wireless communications link is performed with a Bluetooth implementation.

3. The method of claim 1, wherein the local device does not perform a scan to obtain the connection parameters of the broadcast device.

4. The method of claim 1, further comprising saving the received connection parameters for the broadcast device in a memory of the local device to enable future connections with the broadcast device.

5. The method of claim 1, wherein the service registration operation comprises receiving a service discovery request to discover a predefined service running on the local device from the broadcast device, and responding to the service discovery request with a confirmation.

6. The method of claim 1, wherein the method further comprises, with the local device, registering with a server that facilitates communication with the broadcast device, the server being at least a portion of the trusted system.

7. The method of claim 5, wherein registering with the server comprises the receiving the second identifier of the broadcast device and a key for encrypting and decrypting communications with the broadcast device.

8. A method for establishing a secure wireless communications channel between a first device and a second device using a wireless ad hoc communications protocol, in which the first and second devices have been assigned a first and second globally unique identifier (GUID), respectively, comprising:
   receiving from a trusted system, at the first device, the second GUID for the second device and an encryption key, the trusted system being separate from the first device and the second device;
   saving the encryption key received from the trusted system; and
   on the first device, polling for the second device based on the second GUID of the second device, receiving a response to the polling for the second device, authenticating the response, and establishing the secure wireless communications channel with the second device using the ad hoc wireless communications protocol by encrypting packets sent to the second device using the encryption key.

9. The method of claim 8, wherein a link layer key exchange of the ad hoc wireless communications protocol is not performed.

10. The method of claim 8, wherein the first and second GUIDs for the first and second devices are generated by the trusted system.

11. The method of claim 8 wherein the ad hoc wireless communications protocol comprises the Bluetooth wireless standard.

12. At least one hardware recordable medium having stored thereon a sequence of instructions that, when executed by a processor, cause the processor to perform a method for a local device to establish an ad hoc wireless communications link with a broadcast device, the local device having been assigned a first identifier and the broadcast device having been assigned a second identifier, the method comprising:
   receiving from a trusted system, at the local device, the second identifier for the broadcast device and an encryption key, the trusted system being separate from the local device and the broadcast device;
   upon determining that the ad hoc wireless communications link with the broadcast device is to be formed, monitoring for a communication from the broadcast device identifying the local device, the monitoring being performed while the local device is in a low power discoverable mode in which a radio of the local device is turned on selectively;
   receiving connection parameters for the broadcast device from the broadcast device during a service registration operation with the broadcast device; and
   establishing the ad hoc wireless communications link with the broadcast device by sending a connection request to the broadcast device based on the connection parameters.

13. At least one hardware recordable medium having stored thereon a sequence of instructions that, when executed by a processor of a first device, cause the processor to perform a method for establishing a wireless communications channel between the first device and a second device using an ad hoc communications protocol, in which each of the devices has been assigned a respective identifier, the method comprising, on the first device:

receiving at the first device, from a trusted system separate from the first device and the second device, the identifier for the second device;

polling for the second device based on the identifier for the second device; and upon receiving a response to the polling of the second device, authenticating the response in software, and establishing the wireless communications channel with the second device.

14. At least one hardware recordable medium having stored thereon a sequence of instructions that, when executed by a processor of a cellular mobile phone, causes the cellular mobile phone to perform a method for establishing a secure wireless communications channel between the cellular mobile phone and a computer using an ad hoc communications protocol, in which each of the cellular mobile phone and the computer has been assigned a respective identifier, the method comprising:

at the cellular mobile phone:

requesting from a trusted server the identifier for the computer and an encryption key, said encryption key corresponding to another encryption key received by the computer from the trusted server, and the server being separate from the cellular mobile phone and the computer;

storing in memory the encryption key received from the trusted server;

upon determining that the secure wireless communications channel with the computer is to be formed using the ad hoc communications protocol, checking the memory for the encryption key and the identifier for the computer;

when the encryption key and the identifier for the computer are found in the memory, in a low power discoverable mode in which an ad hoc radio of the cellular mobile phone is turned on selectively, listening for the computer to poll the cellular mobile phone using the identifier of the cellular mobile phone;

receiving from the computer a message comprising connection parameters during a service registration operation with the computer;

authenticating the message from the computer using the encryption key;

when the message is authentic, establishing the secure wireless communications channel with the computer by sending a connection request to the computer based on the connection parameters and encrypting packets sent to and decrypting packets received from the computer using the encryption key; and when the encryption key and the identifier for the computer are not found in the memory or when the secure wireless communications channel cannot be established based communications parameters in the memory, transferring data over a cellular network.

15. A system to establish an ad hoc secure wireless communications link with a computer, the system comprising:

a processor, and a memory coupled to the processor, the memory storing instructions that when executed by the processor, cause the system to carry out acts comprising:

receiving from a trusted server an identifier for the computer and an encryption key, said received encryption key corresponding to another encryption key received by the computer from the trusted server, the trusted server being separate from the system and the computer;

saving the encryption key received from the trusted server;

upon determining that the ad hoc secure communications link with the computer is to be formed, while the system is in a low power discoverable mode in which a radio of the system is turned on selectively, listening for the computer to poll the system based on the identifier of the computer;

receiving connection parameters for the computer from the computer during a service registration operation with the computer; and establishing the ad hoc secure wireless communications link with the computer by sending a connection request to the computer based on the connection parameters and encrypting packets sent to and decrypting packets received from the computer using the encryption key.

16. The system of claim 15, wherein the system is a cellular phone.

17. The system of claim 15, wherein the ad hoc secure wireless communications link is in accordance with a Bluetooth protocol implementation.

* * * * *